UNITED STATES PATENT OFFICE.

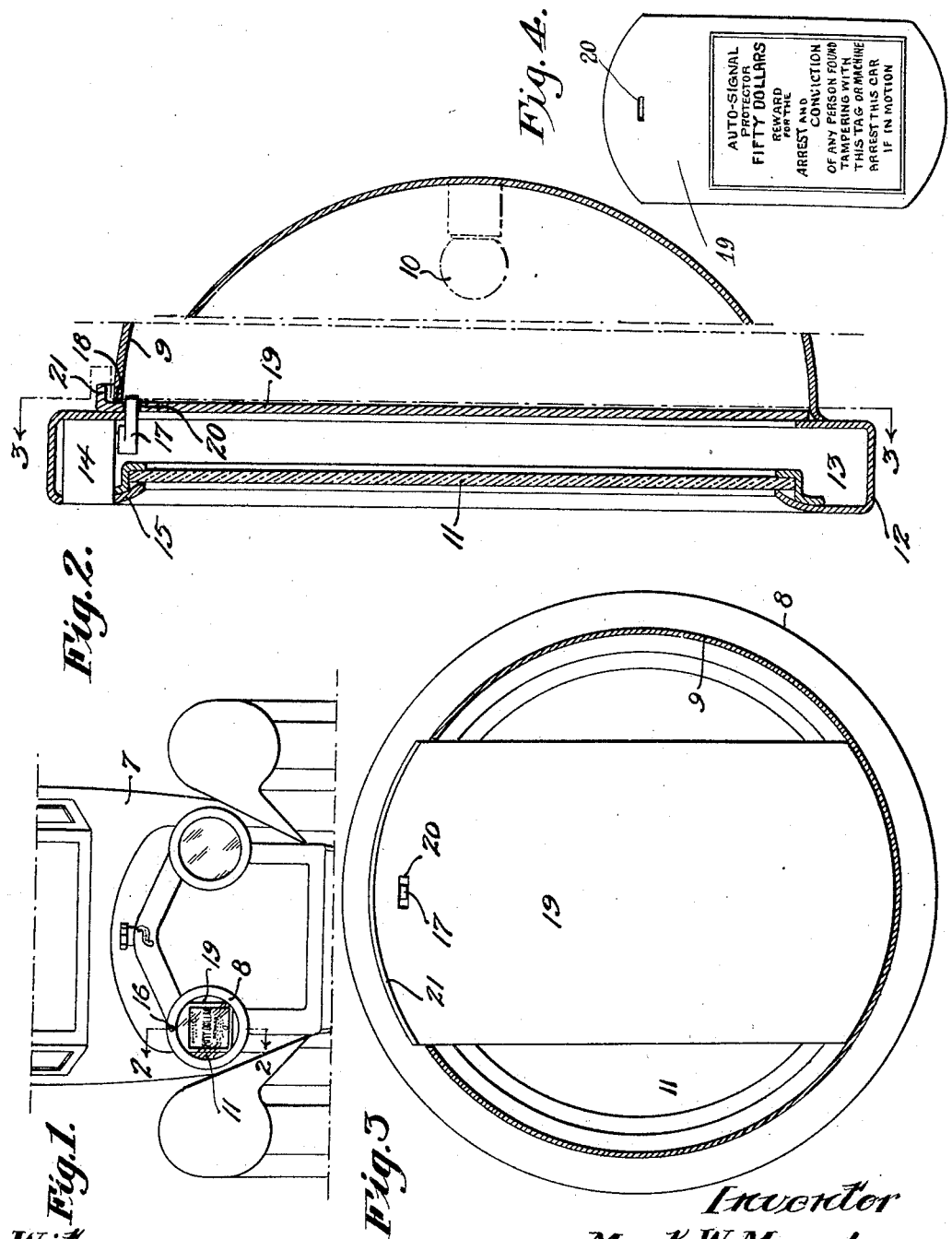

MARK W. MARSDEN, OF PHILADELPHIA, PENNSYLVANIA.

TRESPASS-SIGN FOR AUTOMOBILES.

1,397,770.   Specification of Letters Patent.   Patented Nov. 22, 1921.

Application filed July 1, 1920. Serial No. 393,238.

*To all whom it may concern:*

Be it known that I, MARK W. MARSDEN, a citizen of the United States, residing at Philadelphia, in the county of Philadelphia and State of Pennsylvania, have invented certain new and useful Improvements in Trespass-Signs for Automobiles, of which the following is a specification.

One object of my invention is to provide means which will enable a person to easily detect a stolen automobile and which also will be instrumental to prevent a thief from stealing an automobile having said means thereon.

Another object is to provide a device for the above purpose, which can practically be made in the form of a trespass sign or tag, which will be locked in a position to cover a part or a fixture of an automobile that the law requires to be revealed such for example as in the front of the source of light in a head light and to so arrange the structure that said device will be securely locked so as to prevent its easy removal by a thief but can be readily removed by the owner or other authorized person possessing the key to said lock.

Another object is to make my device of a comparatively simple construction and which will readily attract attention so that if the car is in motion when the device is in said position thereon any person can readily tell that the automobile is a stolen one or is being run by an unauthorized person. Thus the public and especially the police can readily identify a stolen automobile and the automobile can be stopped and if the occupant thereof fails to produce the necessary key to immediately unlock and remove the device said occupant of the automobile can be arrested and the automobile can be easily reclaimed.

These objects, and other advantageous ends which will be described hereinafter, I attain in the following manner, reference being had to the accompanying drawings in which—

Figure 1 is a front elevation of a portion of an automobile showing the device of my invention locked in position in front of one of the sources of light in a head light of the automobile, Fig. 2 is an enlarged fragmentary section taken on the line 2—2 of Fig. 1, Fig. 3 is a transverse section taken on the line 3—3 of Fig. 2, and Fig. 4 is a detail front elevation of a sign which I preferably employ.

Referring to the drawings 7 represents an automobile and 8 represents one of its head lights. The head light 8 includes a casing 9 in the rear of which is any suitable source of light represented diagrammatically at 10. The usual glass 11 is secured within the front of the casing 9; said casing having an annular extension 12 in which said glass is mounted; said extension providing a chamber 13 in the upper portion of which a lock 14 is provided; said lock extending through the front flange 15 of the extension 12 and is preferably provided with a key slot 16 in which the proper key may be inserted to operate the lock 14. The lock 14 may be of any desired type and as illustrated the same includes a bolt or finger 17 which when the lock is operated swings in a rearward position, such for example as shown in Fig. 2. A slot 18 is formed in the top of the casing 9 immediately to the rear of the extension 12 and a sign 19, which may be made of metal in the form of a plate having various characteristic representations on its forward face, such for example as written matter, which would inform any one reading the same through the glass 11 that a reward is offered for any person found tampering with the automobile or riding in the automobile when the device is locked thereon. The sign 19 has a slot 20 into which the bolt 17 is adapted to extend and the upper edge of the sign outside of the casing 9 is preferably provided with a lip or bent portion 21 to permit the fingers to be inserted thereunder to remove the sign after it has been unlocked by an authorized person. Thus the sign 19 can be easily inserted in position or removed therefrom by an authorized person having the proper key to the lock 14.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a vehicle lamp casing; a transparent member forming a closure for the front of said casing; a sign within said casing back of said transparent member so as to be visible through the medium of said transparent member, said sign having portions indicating that if the vehicle is in motion that it is being run by an unauthorized person; and locking means within said casing and operative by selective mechanism outside of said casing, said locking means having a portion adapted to lock said sign in said position; substantially as described.

2. A device of the character described including a vehicle lamp casing; a transparent member forming a closure for the front of said casing; a sign within said casing back of said transparent member so as to be visible through said transparent member, said sign having portions indicating that if the vehicle is in motion that it is being run by an unauthorized person, said sign being made of opaque material; a lamp positioned to the rear of said sign whereby the light from the lamp is not visible through the sign and a lock operative by selective mechanism and having a portion adapted to lock said sign in said position; substantially as described.

3. In a device of the character described, the combination of a vehicle lamp casing; a transparent member closing the front of said casing, said casing having a slot therein; a sign movable into said casing to the rear of said transparent member through the opening provided by said slot; and means for locking said sign in said position whereby the sign is visible within said casing through the medium of said transparent member; said sign having portions indicating that if the vehicle upon which the device is mounted is in motion that it is being run by an unauthorized person; substantially as described.

4. In a device of the character described, the combination of a vehicle lamp casing; a transparent member closing the front of said casing, said casing having a slot therein; a sign movable into said casing to the rear of said transparent member through the opening provided by said slot; and a lock secured to said casing and having a bolt movable into locking engagement with the sign whereby the sign is visible within said casing through the medium of said transparent member; said sign having portions indicating that if the vehicle upon which the device is mounted is in motion that it is being run by an unauthorized person, substantially as described.

5. In a device of the character described, the combination of a vehicle lamp casing; a transparent member closing the front of said casing, said casing having a slot therein; a sign movable into said casing to the rear of said transparent member through the opening provided by said slot; and a lock secured to said casing and having a bolt positioned within the casing and adapted to be moved into locking engagement with the portion of said sign within the casing; substantially as described.

6. In a device of the character described, the combination of a vehicle lamp casing; a transparent member closing the front of said casing, said casing having a slot therein; an opaque sign movable into said casing to the rear of said transparent member and in front of the location of the source of light through the opening provided by said slot; and means for locking said sign in said position; substantially as described.

7. In a device of the character described, the combination of a vehicle lamp casing; a transparent member closing the front of said casing, said casing having a slot therein; an opaque sign movable into said casing to the rear of said transparent member and in front of the location of the source of light through the opening provided by said slot; and a lock secured to said casing and having a bolt movable into locking engagement with the sign; substantially as described.

In testimony whereof I have signed my name to this specification in the presence of two subscribing witnesses.

MARK W. MARSDEN.

Witnesses:
 ELIZABETH GARBE,
 CHAS. E. POTTS.